(12) United States Patent
Kimura

(10) Patent No.: US 8,000,658 B2
(45) Date of Patent: Aug. 16, 2011

(54) COMMUNICATING APPARATUS, COMMUNICATING METHOD, AND COMPUTER PROGRAM PRODUCT

(75) Inventor: Sadahiro Kimura, Kanagawa (JP)

(73) Assignee: Ricoh Company, limited, Tokyo (JP)

( * ) Notice: Subject to any disclaimer, the term of this patent is extended or adjusted under 35 U.S.C. 154(b) by 450 days.

(21) Appl. No.: 12/314,740

(22) Filed: Dec. 16, 2008

(65) Prior Publication Data

US 2009/0181621 A1 Jul. 16, 2009

(30) Foreign Application Priority Data

Jan. 10, 2008 (JP) ................................ 2008-003300

(51) Int. Cl.
*H04B 1/00* (2006.01)
(52) U.S. Cl. .......................................... 455/69; 455/522
(58) Field of Classification Search ...................... 455/69
See application file for complete search history.

(56) References Cited

U.S. PATENT DOCUMENTS

| | | | | |
|---|---|---|---|---|
| 6,243,591 | B1 * | 6/2001 | Takemura ..................... | 455/522 |
| 7,016,653 | B2 * | 3/2006 | Tsunehara et al. ............. | 455/69 |
| 7,643,845 | B2 * | 1/2010 | Okumura et al. ............. | 455/522 |
| 7,873,327 | B2 * | 1/2011 | Rao ................................ | 455/69 |

FOREIGN PATENT DOCUMENTS

| | | |
|---|---|---|
| EP | 1 689 094 | 8/2006 |
| JP | 2002-236561 | 8/2002 |
| JP | 2005-318079 | 11/2005 |
| WO | WO 01/78423 | 10/2001 |
| WO | WO 02/062024 | 8/2002 |

OTHER PUBLICATIONS

European Search Report dated Nov. 26, 2010 issued in corresponding European Application No. 09250007.3.

* cited by examiner

*Primary Examiner* — Hai L Nguyen
(74) *Attorney, Agent, or Firm* — Harness, Dickey & Pierce, P.L.C.

(57) ABSTRACT

A communication control unit transmits a detection message and receives a reply message with respect to an external device via a communicating unit. A first calculating unit calculates distance to the external device based on time required to receive the reply message. A determining unit determines whether the distance is smaller than a predetermined threshold. When the distance is smaller than the threshold, an establishing unit establishes an encryption invalidated communication with the external device, and a second calculating unit calculates minimum transmission power of a wireless signal to communicate with the external device at the distance.

10 Claims, 18 Drawing Sheets

FIG. 3

| DISTANCE BETWEEN COMMUNICATION TARGETS | TRANSMISSION POWER |
|---|---|
| 0.5 m | −50 dBm |
| 1 m | −45 dBm |
| 1.5 m | −40 dBm |
| 2 m | −35 dBm |
| 2.5 m | −30 dBm |
| 3 m | −25 dBm |
| 4 m | −20 dBm |
| 5 m | −15 dBm |
| 6 m | −10 dBm |
| ≥ 7 m | 0 dBm |

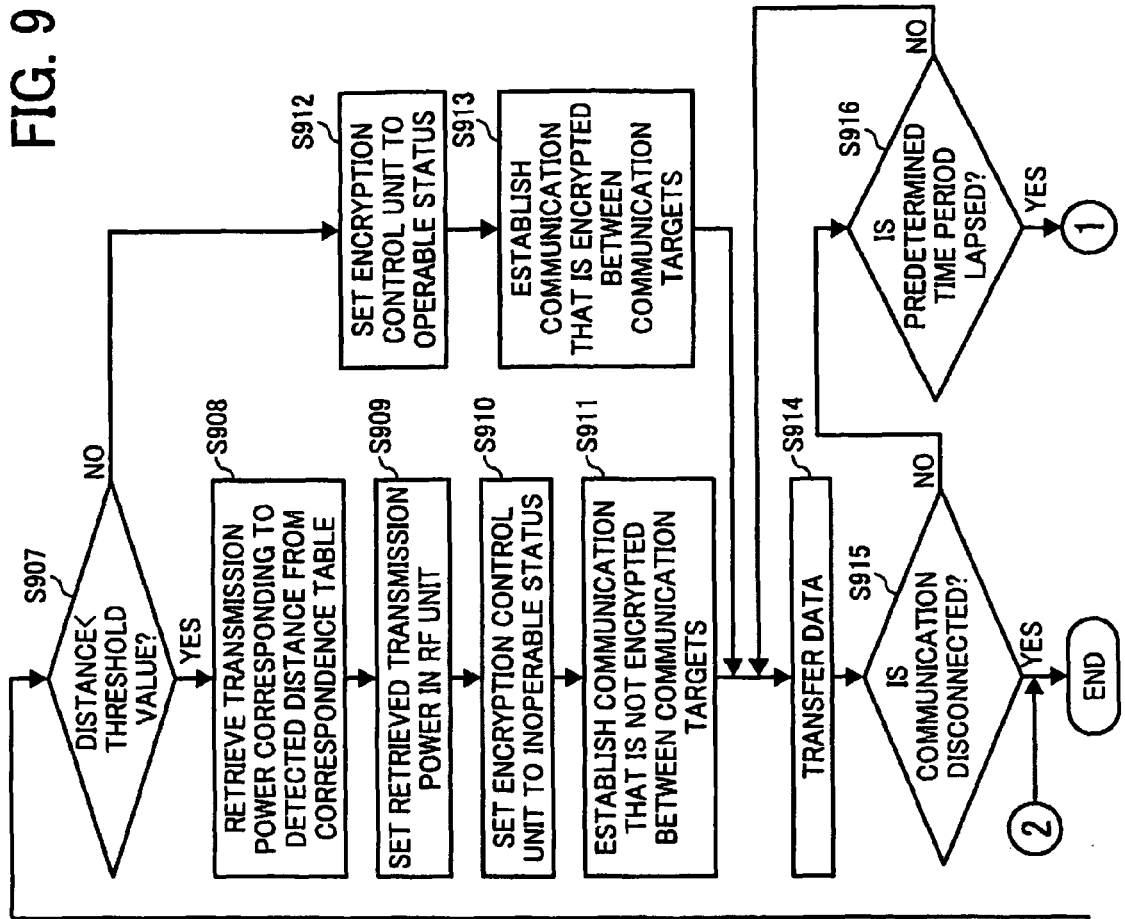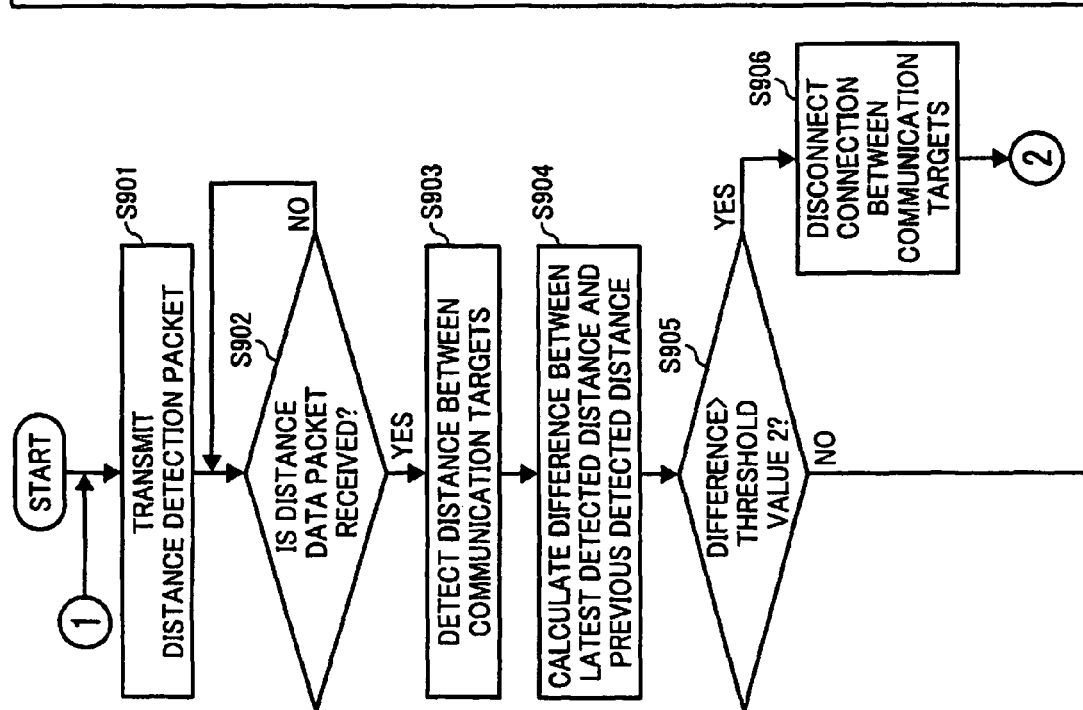
FIG. 9

COMMUNICATING APPARATUS, COMMUNICATING METHOD, AND COMPUTER PROGRAM PRODUCT

CROSS-REFERENCE TO RELATED APPLICATIONS

The present application claims priority to and incorporates by reference the entire contents of Japanese priority document 2008-003300 filed in Japan on Jan. 10, 2008.

BACKGROUND OF THE INVENTION

1. Field of the Invention

The present invention relates to a communicating apparatus that includes a security function, a communicating method, and a computer program product.

2. Description of the Related Art

In many instances, along with development of a wireless technology, communication, which was typically carried out by wired connections, is now changed to wireless connections. For example, in a local area network (LAN), Ethernet (registered trademark) connections typified by Institute of Electrical and Electronics Engineers (IEEE) 802.3 were predominantly used. However, in recent years, many data communicating apparatuses are using wireless LAN connections typified by IEEE 802.11 system. The usage of wireless communication is increased not only in the LAN but also in a personal area network (PAN).

Based on physical properties of wireless communication, any individual can receive a packet transmitted by the wireless connections. Thus, a security function is necessary for preventing interception of the packet and protecting privacy. Generally, an authenticated method that uses a common key is used as a security function implementing method. However, prior exchange of the key between communicating parties is necessary in a common key system. Thus, the key exchange, which is not required in wired communication, is severely hampering convenience of wireless communication.

Various methods have been developed for enhancing convenience of the key exchange. For example, a technology is proposed in Japanese Patent Application Laid-open No. 2005-318079 in which terminals are interconnected by a wire cable and the key exchange is carried out in wireless communication when an electric potential of the cable is active.

In the technology mentioned earlier, irrespective of carrying out wireless communication, drawbacks such as inconvenience due to requirement of the wired connections, and a cost increase resulting from arrangement of a specific wire interface are not overcome.

SUMMARY OF THE INVENTION

It is an object of the present invention to at least partially solve the problems in the conventional technology.

According to one aspect of the present invention, there is provided a communicating apparatus including a communicating unit that exchanges a message with an external device using a wireless signal; a communication control unit that transmits a detection message for detecting a distance to the external device to the external device and receives a reply message in response to the detection message from the external device, via the communicating unit; a first calculating unit that calculates the distance based on a response time required to receive the reply message; a determining unit that determines whether the distance is smaller than a first threshold; an establishing unit that establishes, when the distance is determined to be smaller than the first threshold, an encryption invalidated communication in which the message is not encrypted with the external device; and a second calculating unit that calculates, when the distance is determined to be smaller than the first threshold, a minimum transmission power of the wireless signal for performing a communication with the external device at the distance. The communication control unit controls the communicating unit to transmit the message to the external device using the wireless signal with the minimum transmission power.

Furthermore, according to another aspect of the present invention, there is provided a communication method for a communicating apparatus including a communicating unit that exchanges a message with an external device using a wireless signal. The communication method includes controlling including transmitting a detection message for detecting a distance to the external device to the external device and receiving a reply message in response to the detection message from the external device, via the communicating unit; first calculating including calculating the distance based on a response time required to receive the reply message; determining whether the distance is smaller than a first threshold; establishing, when the distance is determined to be smaller than the first threshold, an encryption invalidated communication in which the message is not encrypted with the external device; and second calculating including calculating, when the distance is determined to be smaller than the first threshold, a minimum transmission power of the wireless signal for performing a communication with the external device at the distance. The controlling further includes controlling the communicating unit to transmit the message to the external device using the wireless signal with the minimum transmission power.

Moreover, according to still another aspect of the present invention, there is provided a computer program product including a computer-usable medium having computer-readable program codes embodied in the medium for realizing a communication method for a communicating apparatus including a communicating unit that exchanges a message with an external device using a wireless signal. The program codes when executed cause a computer to execute controlling including transmitting a detection message for detecting a distance to the external device to the external device and receiving a reply message in response to the detection message from the external device, via the communicating unit; first calculating including calculating the distance based on a response time required to receive the reply message; determining whether the distance is smaller than a first threshold; establishing, when the distance is determined to be smaller than the first threshold, an encryption invalidated communication in which the message is not encrypted with the external device; and second calculating including calculating, when the distance is determined to be smaller than the first threshold, a minimum transmission power of the wireless signal for performing a communication with the external device at the distance. The controlling further includes controlling the communicating unit to transmit the message to the external device using the wireless signal with the minimum transmission power.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table for explaining a data structure of a correspondence table;

FIG. 9 is a flowchart for explaining an entire communication process in a modification of the second embodiment;

DETAILED DESCRIPTION OF THE PREFERRED EMBODIMENTS

Exemplary embodiments according to the present invention are explained in detail below with reference to the accompanying drawings.

Generally, a security function that encrypts a packet by a common key is included in wireless communication. The security function is necessary if a threat of interception and a threat of impersonation exist around a user. In other words, the security function is necessary if a malicious user exists in a service area. Thus, if there is no risk in the service area, the security function is not at all required.

Figure 1:
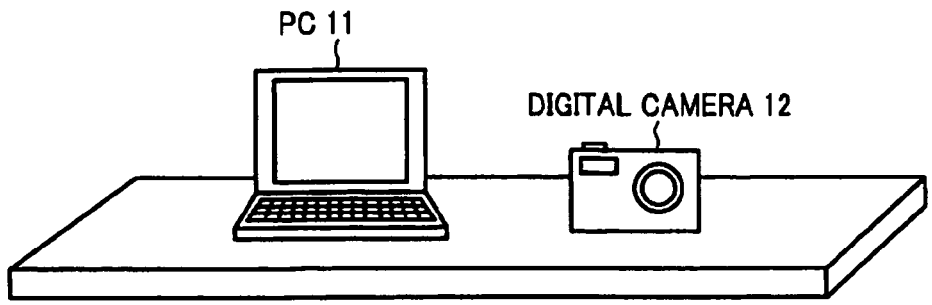
FIG. 1 is a schematic diagram for explaining an example of an arrangement of devices that carry out wireless communication.

FIG. 1 is a schematic diagram for explaining an example of an arrangement of devices that carry out wireless communication. As shown in FIG. 1, a personal computer (PC) 11, which is a notebook type, and a digital camera 12, proximally arranged. The PC 11 and the digital camera 12 can perform a wireless communication with each other.

Downloading of images stored in the digital camera 12 to the PC 11 is explained in the example shown in FIG. 1. When downloading the images in the digital camera 12 to the PC 11 by wired communication, power supply of the PC 11 is turned on and the digital camera 12 is linked to the PC 11 by a universal serial bus (USB) cable. Normally, the PC 11 and the digital camera 12 are arranged very close to each other for linking using a wire cable.

When realizing the operation mentioned earlier by using wireless communication, even if the PC 11 and the digital camera 12 shown in FIG. 1 are arranged very close to each other, because a wireless propagation range cannot be restricted, the security function is necessary. However, a malicious user rarely exists within a range of one to two meters in the vicinity of the PC 11. Accordingly, introducing the security function in an environment shown in FIG. 1 is considered as an excessive measure.

A communicating apparatus according to a first embodiment of the present invention measures a distance between the devices (communication targets) that are the communicating parties. The communicating apparatus determines whether the distance is within a predetermined setting range. If the distance is within the predetermined setting range, an encryption process is invalidated and transmission power is changed to a minimum level that enables transceiving of data within the predetermined setting range. Thus, the extra security function can be excluded and wireless communication can be carried out more conveniently without causing an extra increment in the cost.

Figure 2:
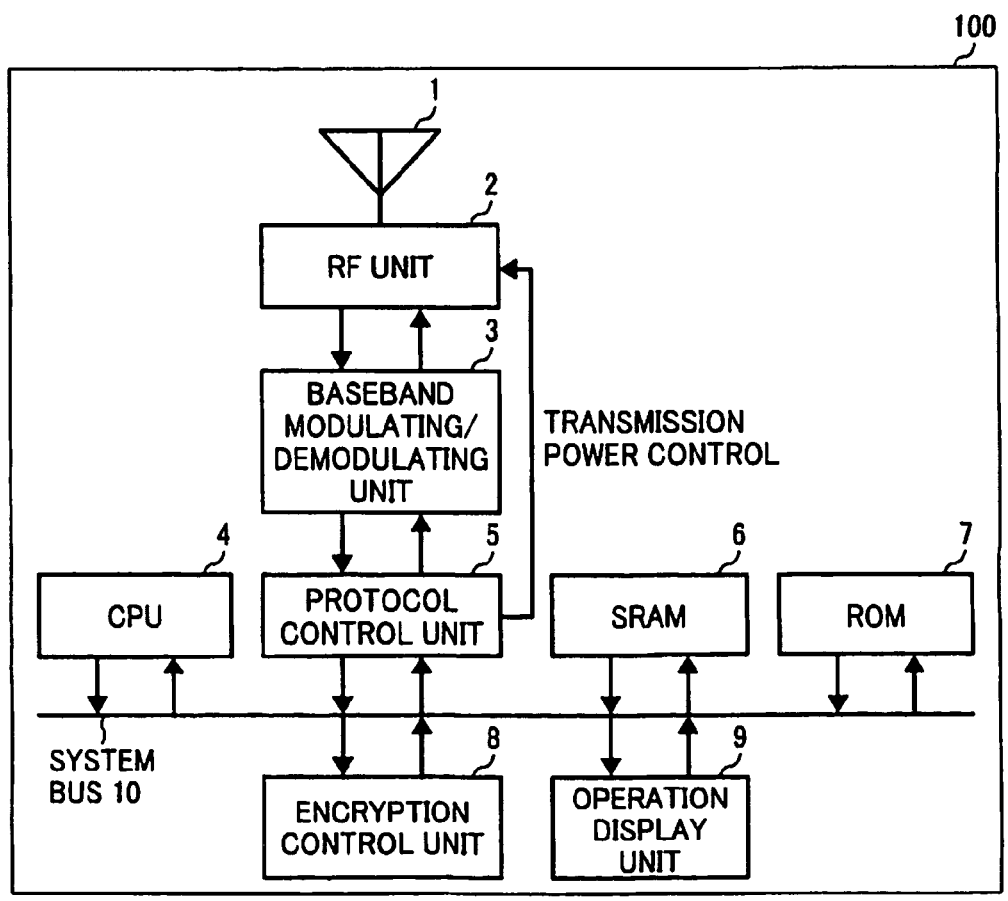
FIG. 2 is a block diagram of a communicating apparatus according to a first embodiment of the present invention.

FIG. 2 is a block diagram of a communicating apparatus 100 according to the first embodiment. As shown in FIG. 2, the communicating apparatus 100 includes an antenna 1, a radio frequency (RF) unit 2, a baseband modulating/demodulating unit 3, a central processing unit (CPU) 4, a protocol control unit 5, a static random access memory (SRAM) 6, a read only memory (ROM) 7, an encryption control unit 8, and an operation display unit 9 that are connected by a system bus 10.

The antenna 1 transceives electric waves for carrying out wireless communication between external devices. The RF unit 2 carries out frequency conversion and power amplification.

The baseband modulating/demodulating unit 3 is a control unit that executes a frequency modulation and demodulation process of an orthogonal-frequency-division multiplexing system that is based on wireless communication standards. The orthogonal-frequency-division multiplexing system is a system in which a plurality of carrier waves are used and frequency band is effectively used by partially overlapping carrier wave bands such that phases of signal waves to be modulated are orthogonal between the adjacent carrier waves. The orthogonal-frequency-division multiplexing system is used in Institute of Electrical and Electronics Engineers (IEEE) 802.11a and IEEE 802.11g that are standards of a wireless local area network (LAN).

The CPU 4 is a processor for controlling the entire system. The CPU 4 mainly functions as a detecting unit for detecting a distance between the external devices that are the communicating parties and a determining unit for determining, by comparing the detected distance to a predetermined threshold value, whether the detected distance is smaller than the threshold value. If the distance is smaller than the threshold value, the CPU 4 also functions as a calculating unit for calculating a minimum transmission power that indicates a minimum value of the transmission power of wireless signals enabling communication with the external device. The functions of the CPU 4 are described in detail later.

Based on a wireless universal serial bus (USB) protocol, the protocol control unit 5 controls transceiving, of messages (packets), carried out by wireless communication between the external devices. Normally, based on the wireless USB protocol, the protocol control unit 5 establishes communication that is encrypted by exchanging a key data. An applicable wireless communication protocol is not restricted to the wireless USB protocol and any wireless communication protocol can be applied that can detect from the transceiving packets, the distance between the external devices.

If the distance between the external devices is smaller than the threshold value, the protocol control unit 5 functions as an establishing unit for establishing between the external devices, communication in which the encryption process is invalidated by the encryption control unit 8 that is described later. The protocol control unit 5 also functions as a communication control unit for controlling the RF unit 2 such that the wireless signals are transmitted using the minimum transmission power.

The SRAM 6 is a storage unit that is used as a work area by the CPU 4. The ROM 7 is a storage unit for storing therein communication programs executed by the CPU 4. The ROM 7 also stores therein a correspondence table for calculating the minimum transmission power according to the distance.

FIG. 3 is a table for explaining a data structure of the correspondence table. As shown in FIG. 3, the correspondence table stores therein values of the transmission power corresponding to the distance between the external devices that are the communication targets. The protocol control unit 5 decides the transmission power according to the detected distance by referring to the correspondence table shown in FIG. 3. Using a predetermined mathematical expression, which calculates the transmission power from the distance, instead of the correspondence table, enables to decide the transmission power.

Returning to FIG. 2, the encryption control unit 8 encrypts and decrypts the packets that are transceived. All existing protocols that are used in wireless communication such as a common key system can be applied as encryption and decryption protocols.

The operation display unit 9 receives operation inputs from the user and displays various screens. The operation display unit 9 can be formed by an input interface such as a keyboard and a mouse and an output device such as a liquid crystal display.

Figure 4:
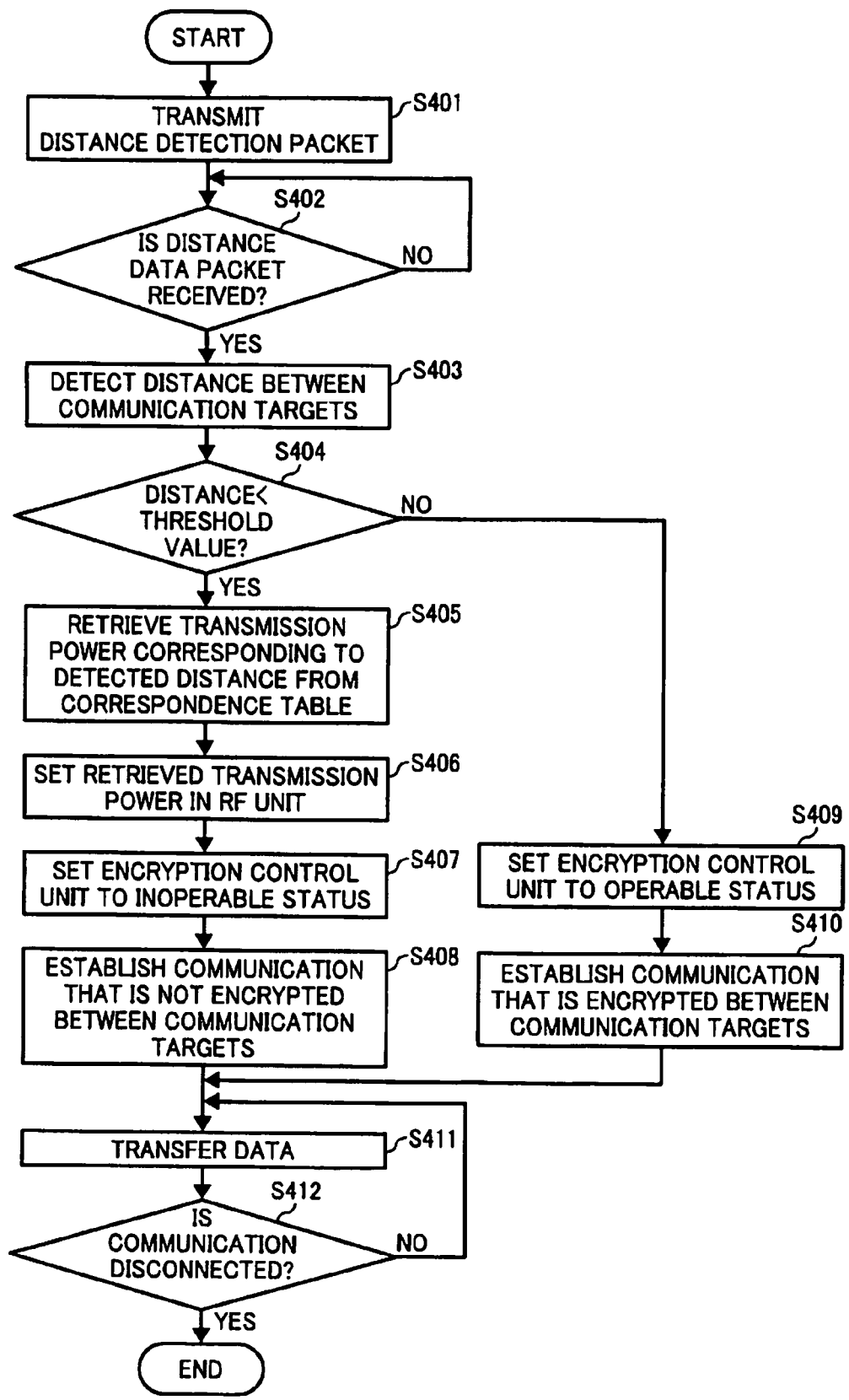
FIG. 4 is a flowchart for explaining an entire communication process according to the first embodiment.

A communication process performed by the communicating apparatus 100 according to the first embodiment is explained next. FIG. 4 is a flowchart for explaining the entire communication process according to the first embodiment.

The protocol control unit 5 generates a packet (distance detection packet) for detecting the distance between the communication targets, sets the maximum transmission power with respect to the RF unit 2, and transmits the generated packet (Step S401). Specifically, after the packet generated by the protocol control unit 5 is modulated by the baseband modulating/demodulating unit 3 and converted into baseband signals, the baseband signals are superimposed on a carrier frequency by the RF unit 2 and are transmitted to the communication target from the antenna 1.

The communication target that has received the distance detection packet transmits a reply packet (distance data packet) in response to the distance detection packet. The protocol control unit 5 can receive the distance data packet via the antenna 1, the RF unit 2, and the baseband modulating/demodulating unit 3. The protocol control unit 5 determines whether the distance data packet is received (Step S402). If the distance data packet is not received (No at Step S402), the process is repeated until the distance data packet is received.

If the distance data packet is received (Yes at Step S402), the CPU 4 receives the distance data packet from the protocol control unit 5, analyzes the distance data packet, and detects the distance between the communication targets (Step S403). Specifically, after the distance detection packet is transmitted, the CPU 4 calculates the distance between the communication target to which the distance data packet is transmitted and the communicating apparatus 100 based on a response time period in which the corresponding distance data packet is received.

The CPU 4 compares the detected distance to a prior set distance threshold value and determines whether the detected distance is smaller than the distance threshold value (Step S404). If the detected distance is smaller than the distance threshold value (Yes at Step S404), the CPU 4 determines that the communication target exists in a short distance. The CPU 4 decides the transmission power by referring to the correspondence table and notifies the transmission power to the protocol control unit 5 (Step S405).

The protocol control unit 5 sets the RF unit 2 such that the wireless signals are transmitted using the decided transmission power (Step S406). The CPU 4 sets the encryption control unit 8 such that the encryption process is not executed in the further communication (Step S407). For example, the CPU 4 sets in a predetermined register in the encryption control unit 8, data that indicates invalidation of encryption. Thus, the encryption control unit 8 determines whether to execute the encryption process according to settings in the register and executes the encryption process only if encryption is valid.

Based on the wireless USB protocol, Subsequently, based on the wireless USB protocol, the protocol control unit 5 establishes communication not encrypted between the communication targets (Step S408).

Upon determining at Step S404 that the detected distance is not smaller than the threshold value (No at Step S404), the CPU 4 sets the encryption control unit 8 such that the encryption process is executed in the further communication (Step S409). Subsequently, based on the wireless USB protocol, the protocol control unit 5 establishes communication encrypted between the communication targets (Step S410). For example, the protocol control unit 5 authenticates the communication target by exchanging the prior stored common key, and when the communication target is authenticated, the protocol control unit 5 establishes communication encrypted by the common key.

Next, based on the established communication, the protocol control unit 5 transceives data between the communication targets (Step S411). The protocol control unit 5 determines whether communication is disconnected due to receipt of a predetermined packet (Step S412). If communication is not disconnected (No at Step S412), a data transfer process continues. If communication is disconnected (Yes at Step S412), the communication process ends.

Figure 5:
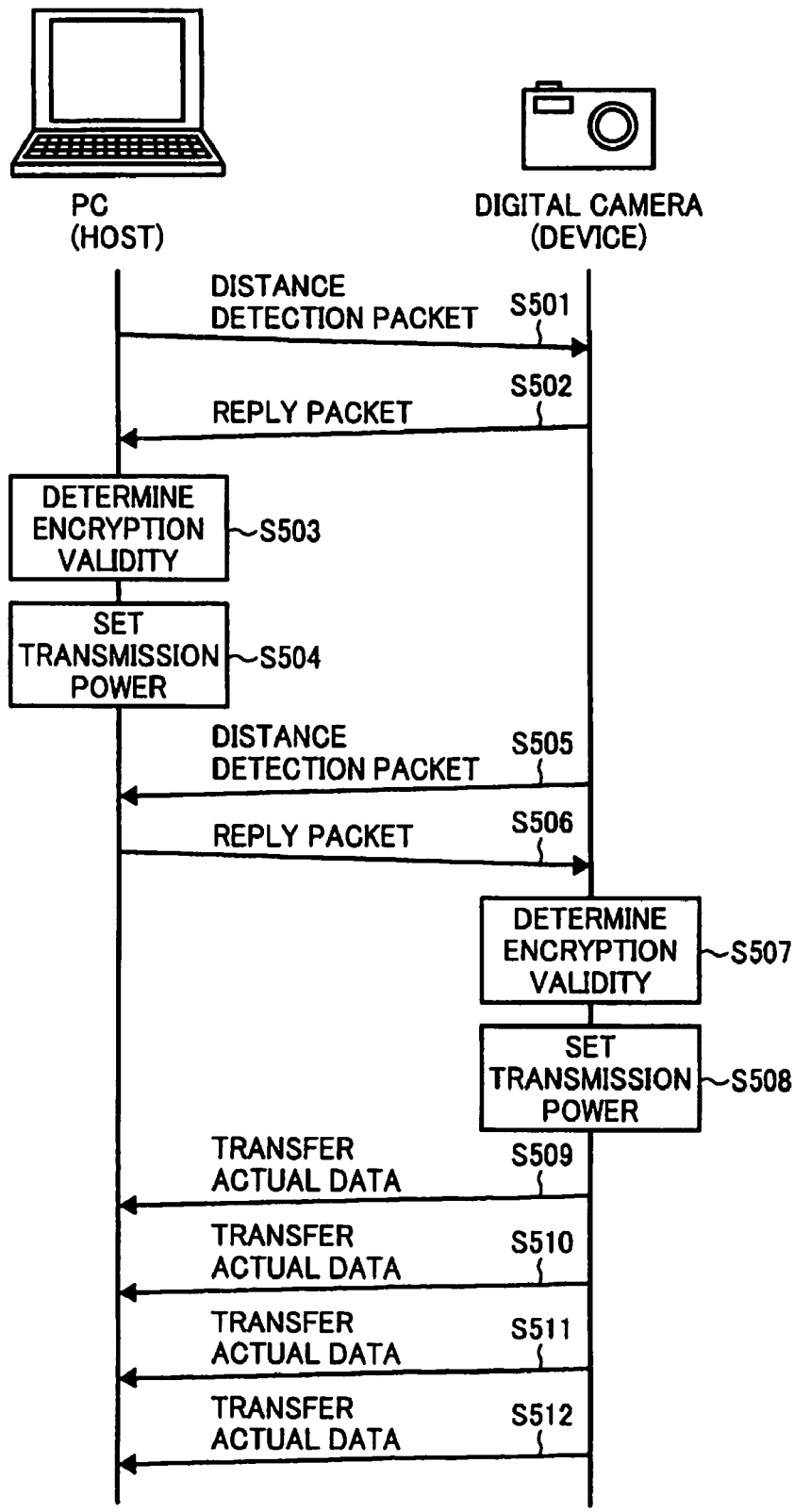
FIG. 5 is a sequence diagram for explaining an overview of the communication process according to the first embodiment.

FIG. 5 is a sequence diagram for explaining an overview of the communication process when a laptop that functions as the communicating apparatus 100 is assumed as a host and a digital camera that functions as the communicating apparatus 100 is assumed as a device.

As shown in FIG. 5, the laptop and the digital camera mutually transmit the distance detection packet (Steps S501 and S505) and also transmit the reply packet in response to the received distance detection packet (Steps S502 and S506). The laptop and the digital camera respectively execute an encryption validity determining process according to the detected distance (Steps S503 and S507) and a transmission power setting process (Steps S504 and S508). If communication is established, the digital camera transfers actual data such as a captured image data to the laptop (Steps S509 to S512).

Thus, the communicating apparatus according to the first embodiment can measure the distance between the communication targets. If the distance is within the predetermined setting range, the communicating apparatus can change the transmission power to the minimum level that enables transceiving of data within the predetermined setting range, and can invalidate the encryption process. Due to this, a convenient communication environment can be provided in which a user is not requested to set an unnecessary key. However, because the wireless propagation range is restricted to a requisite minimum limit, lowering of the security can be avoided by invalidating the encryption.

A value predetermined in the ROM 7 can be used as the threshold value for determining the distance. Alternatively, a value input by the user via the operation display unit 9 can be used as the threshold value. When using the value input by the user via the operation display unit 9, communication according to a usage purpose of the user and environment can be carried out.

According to first embodiment, if the distance between the communication targets is smaller, the encryption is unconditionally invalidated. At the same time, a confirmation message indicating whether to invalidate encryption is displayed on the operation display unit 9 for the confirmation of the user. The encryption can be invalidated only if the user inputs data indicating permission for invalidating the encryption. Thus, more secured communication can be implemented according to the usage purpose of the user and the environment.

In the first embodiment, the distance between the communication targets is detected only at the first time before establishing communication. However, depending on a usage status of the devices, the distance between the communication targets is likely to change. Thus, a communicating apparatus according to a second embodiment of the present invention executes after every lapse of a predetermined time period, the process for detecting the distance between the communication targets, and the encryption validity determining process according to the distance.

Figure 6:
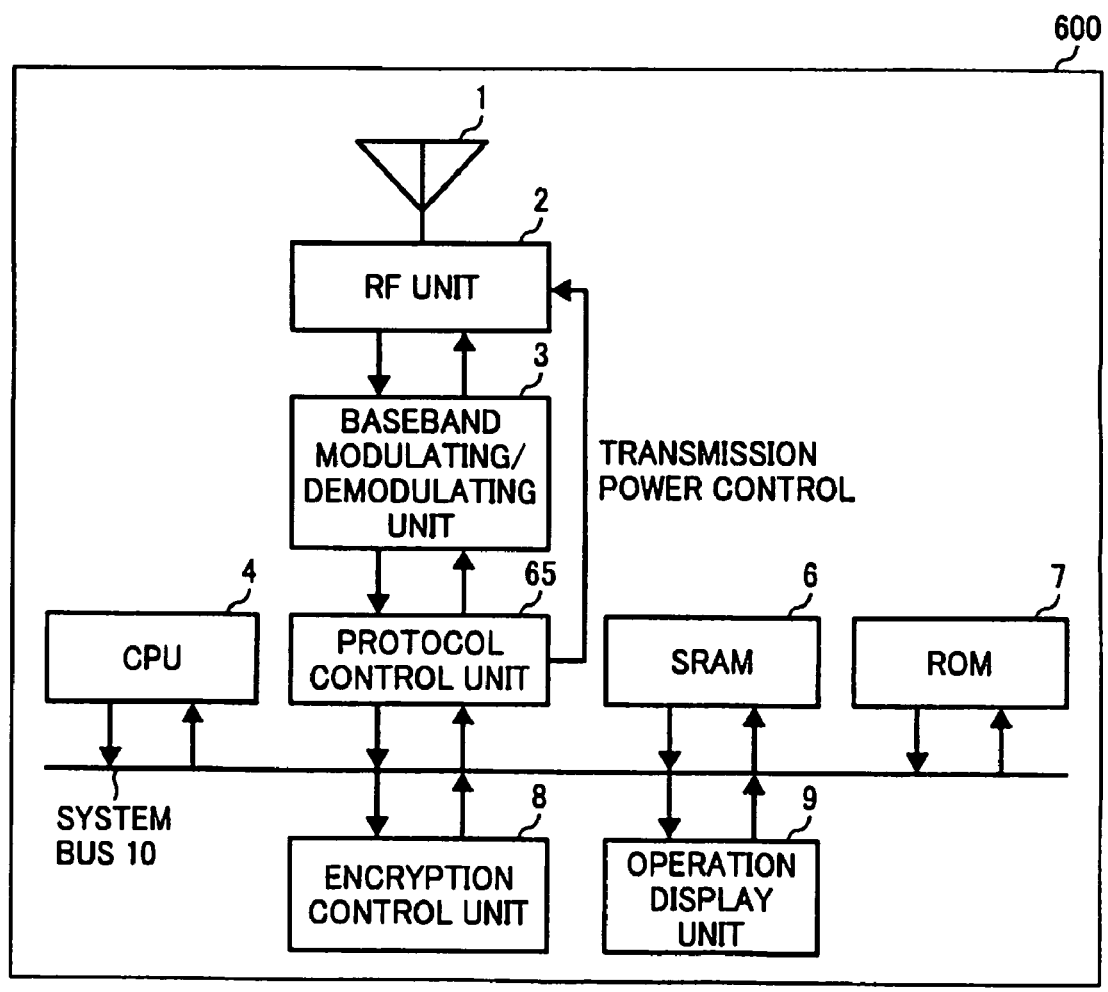
FIG. 6 is a block diagram of a communicating apparatus according to a second embodiment of the present invention.

FIG. 6 is a block diagram of a communicating apparatus 600 according to the second embodiment. As shown in FIG. 6, the communicating apparatus 600 includes the antenna 1, the RF unit 2, the baseband modulating/demodulating unit 3, the CPU 4, a protocol control unit 65, the SRAM 6, the ROM 7, the encryption control unit 8, and the operation display unit 9 that are connected by the system bus 10.

In the second embodiment, functions of the protocol control unit 65 differ from the functions of the protocol control unit 5 according to the first embodiment. A remaining structure and functions, of the communicating apparatus 600, which are similar to the structure and the respective functions of the communicating apparatus 100 according to the first embodiment, are indicated by the same reference numerals and an explanation is omitted.

The protocol control unit 65 transmits the distance detection packet after every lapse of the predetermined time period and executes the distance detection process compared to the protocol control unit 5 according to the first embodiment.

Figure 7:
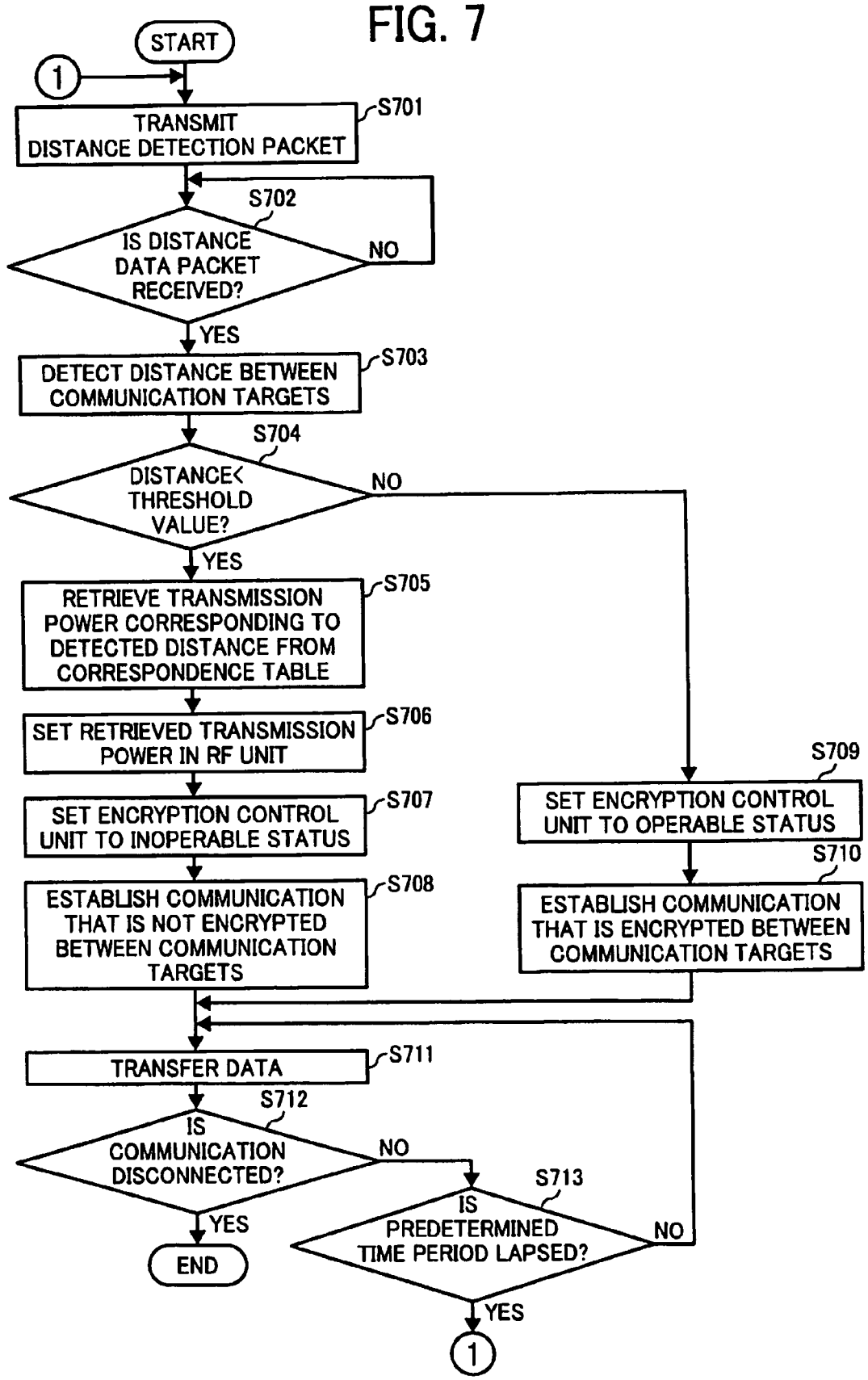
FIG. 7 is a flowchart for explaining an entire communication process according to the second embodiment.

A communication process performed by the communicating apparatus 600 according to the second embodiment is explained next. FIG. 7 is a flowchart for explaining the entire communication process according to the second embodiment.

In the second embodiment, a process is added for determining whether the predetermined time period is lapsed (Step S713). Specifically, upon determining that communication is not disconnected (No at Step S712), the protocol control unit 65 compares a previous distance detection time that is saved in the SRAM 6 to a current time and determines whether the predetermined time period is lapsed. If the predetermined time period is not lapsed (No at Step S713), the data transfer process continues (Step S711). If the predetermined time period is lapsed, the protocol control unit 65 once again generates and transmits the distance detection packet (Step S701).

The remaining steps of the communication process are similar to the respective steps of the communication process performed by the communicating apparatus 100 according to the first embodiment and the explanation is omitted.

Figure 8:
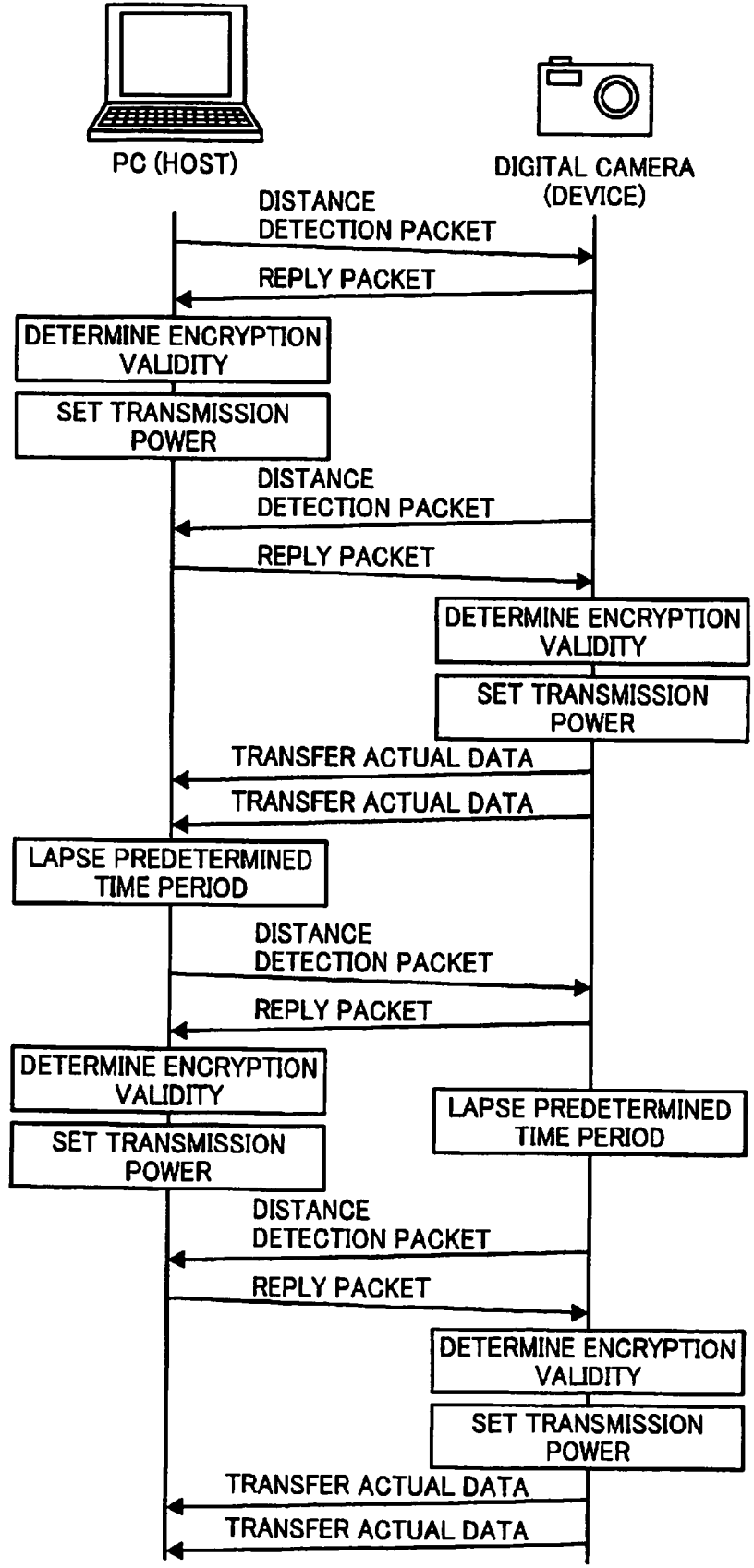
FIG. 8 is a sequence diagram for explaining an overview of the communication process according to the second embodiment.

FIG. 8 is a sequence diagram for explaining an overview of the communication process according to the second embodiment. As shown in FIG. 8, a laptop that functions as the communicating apparatus 600 and a digital camera that functions as the communicating apparatus 600 repeat the distance detection process, the encryption validity determining process, and the transmission power setting process after every lapse of the predetermined time period.

Furthermore, variation in the distance is calculated by detecting the distance at regular intervals. If variation in the distance exceeds the predetermined threshold value, communication between the communication targets can be disconnected.

FIG. 9 is a flowchart for explaining the entire communication process in a modification of the second embodiment.

Steps S901 to S903 of the distance detection process are similar to Steps S701 to S703 of the distance detection process explained with reference to FIG. 7 and the explanation is omitted.

After the distance is detected, the CPU 4 calculates a difference between a latest detected distance and the previous detected distance (Step S904). The detected distances stored in the SRAM 6 can be referred at the time of calculating the difference.

The CPU 4 determines whether the calculated difference is greater than a predetermined threshold value 2 (Step S905). If the calculated difference is greater than the predetermined threshold value 2 (Yes at Step S905), the protocol control unit 65 disconnects communication established between the communication targets (Step S906). If the calculated difference is smaller than the threshold value 2 (No at Step S905), the detected distance is compared to the threshold value of the distance (Step S907).

Steps S907 to S916 of the communication process are similar to Steps S704 to S713 of the communication process explained with reference to FIG. 7 and the explanation is omitted.

In the communicating apparatus according to the second embodiment, the distance between the communication targets is measured at regular intervals. As a result, a status of the communication targets can be sequentially understood. Thus, the communicating apparatus can flexibly deal with a change in the status when the communication targets are moved. For example, if the communication targets are moved further away, communication can be disconnected.

A communicating apparatus according to a third embodiment of the present invention restricts a number of communication targets that communicate by invalidating the encryption.

Figure 10:
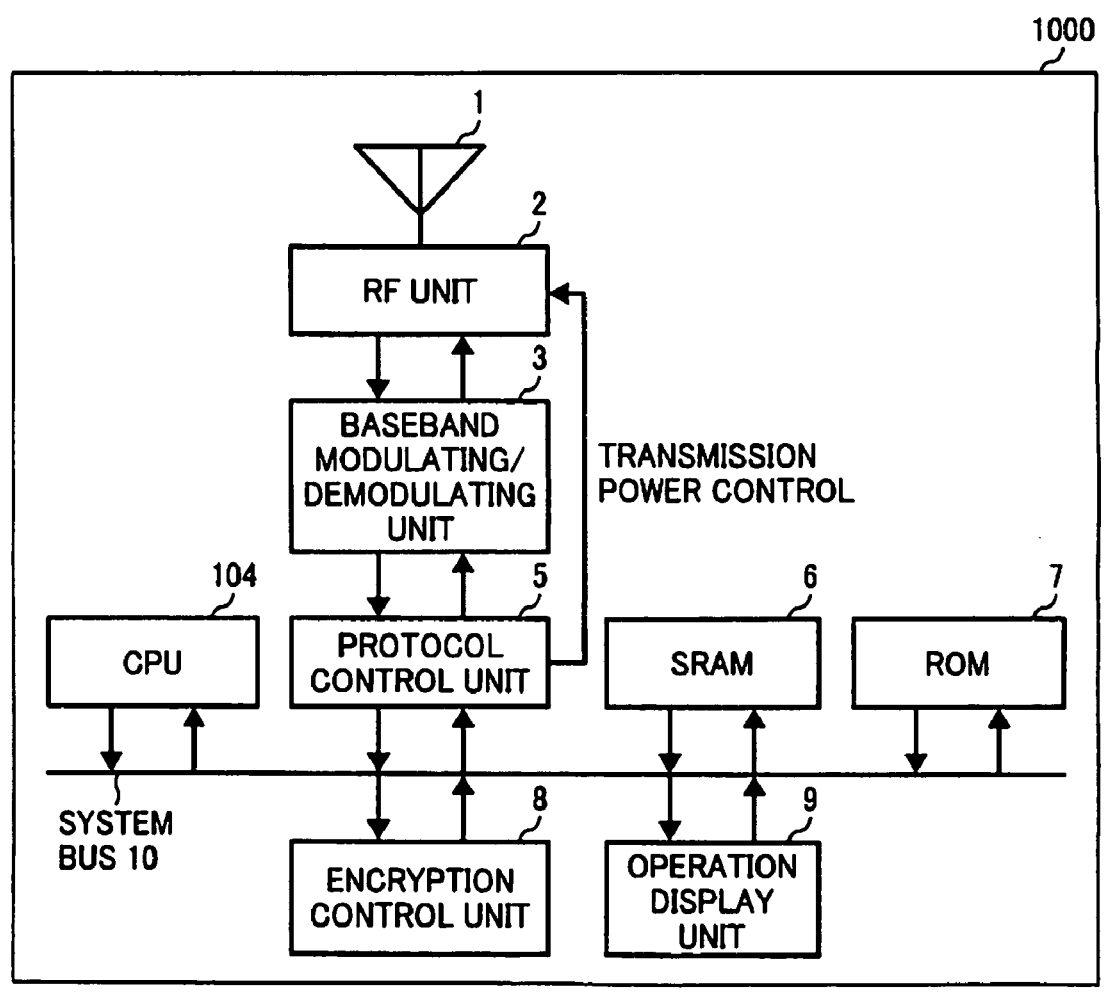
FIG. 10 is a block diagram of a communicating apparatus according to a third embodiment of the present invention.

FIG. 10 is a block diagram of a communicating apparatus 1000 according to the third embodiment. As shown in FIG.

10, the communicating apparatus 1000 includes the antenna 1, the RF unit 2, the baseband modulating/demodulating unit 3, a CPU 104, the protocol control unit 5, the SRAM 6, the ROM 7, the encryption control unit 8, and the operation display unit 9 that are connected by the system bus 10.

In the third embodiment, functions of the CPU 104 differ from the functions of the CPU 4 according to the first embodiment. The remaining structure and the functions, of the communicating apparatus 1000, which are similar to the structure and the respective functions of the communicating apparatus 100 according to the first embodiment, are indicated by the same reference numerals and an explanation is omitted.

In the third embodiment, compared to the CPU 4 according to the first embodiment, upon determining that the detected distance is smaller than the threshold value, the CPU 104 determines whether the number of communication targets for which the encryption invalidated communication is already established is smaller than a predetermined threshold value. The CPU 104 permits the protocol control unit 5 to establish communication only if the number of communication targets for which encryption invalidated communication is established is smaller than the threshold value.

Figure 11:
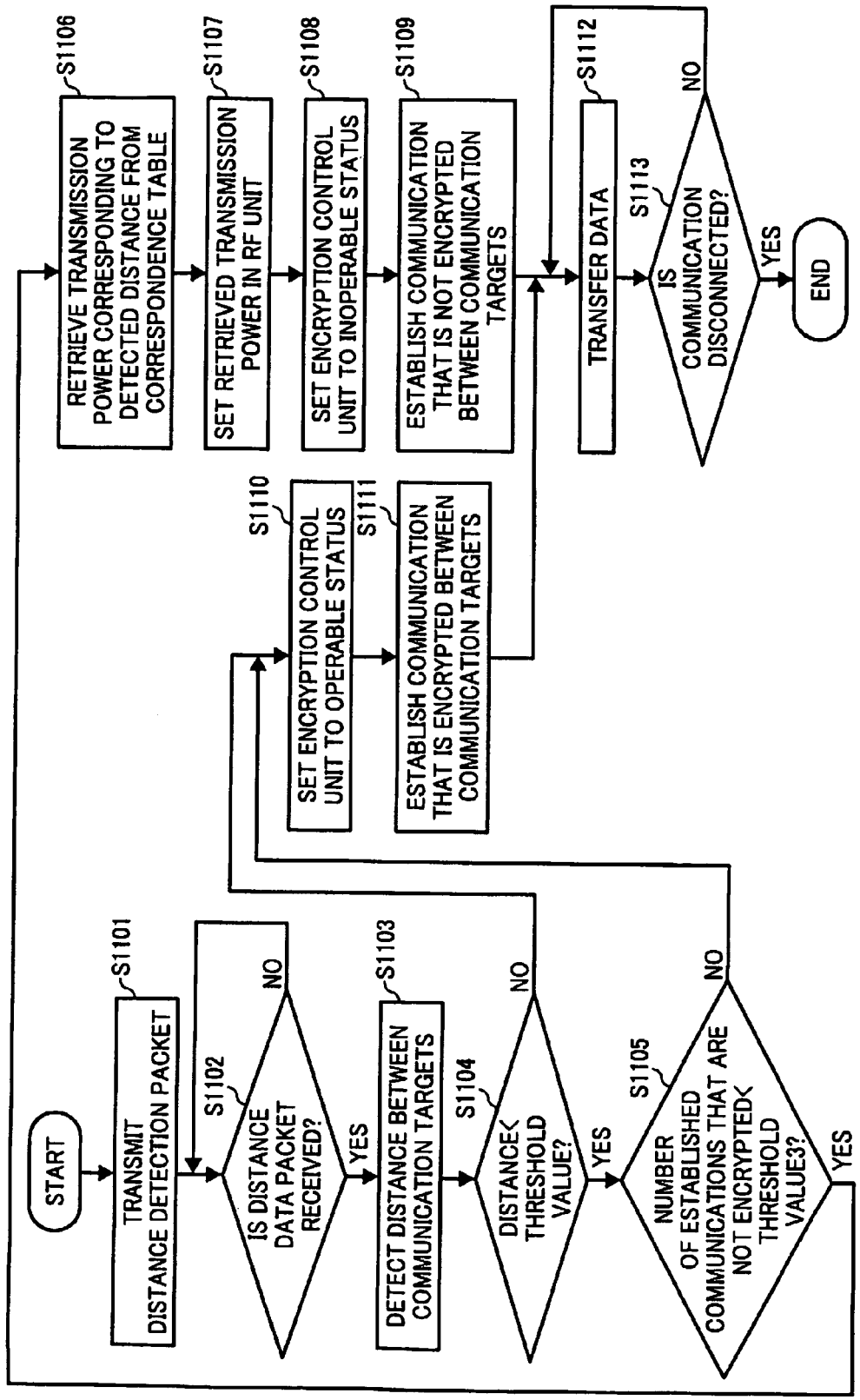
FIG. 11 is a flowchart for explaining an entire communication process according to the third embodiment.

A communication process performed by the communicating apparatus 1000 according to the third embodiment is explained next. FIG. 11 is a flowchart for explaining the entire communication process according to the third embodiment.

Steps S1101 to S1104 of the distance detection process and a threshold value comparison process are similar to Steps S401 to S404 of the respective processes performed by the communicating apparatus 100 according to the first embodiment and the explanation is omitted.

If the detected distance is smaller than the distance threshold value (Yes at Step S1104), the CPU 104 further determines whether the number of established encryption invalidated communications is smaller than a threshold value 3 (Step S1105). If the number of established encryption invalidated communications is smaller than the threshold value 3 (Yes at Step S1105), the CPU 104 decides the transmission power by referring to the correspondence table and notifies the transmission power to the protocol control unit 5 (Step S1106).

If the number of established encryption invalidated communications is greater than the threshold value 3 (No at Step S1105), the CPU 104 determines that further encryption invalidated communications cannot be established. The CPU 4 sets the encryption control unit 8 such that the encryption process is executed with respect to a new communication target (Step S1110).

Step S1111 of an encryption communication establishing process and Steps S1107 to S1113 are similar to Step S410 and Steps S406 to S412 of the respective processes performed by the communicating apparatus 100 according to the first embodiment and the explanation is omitted.

Figure 12:
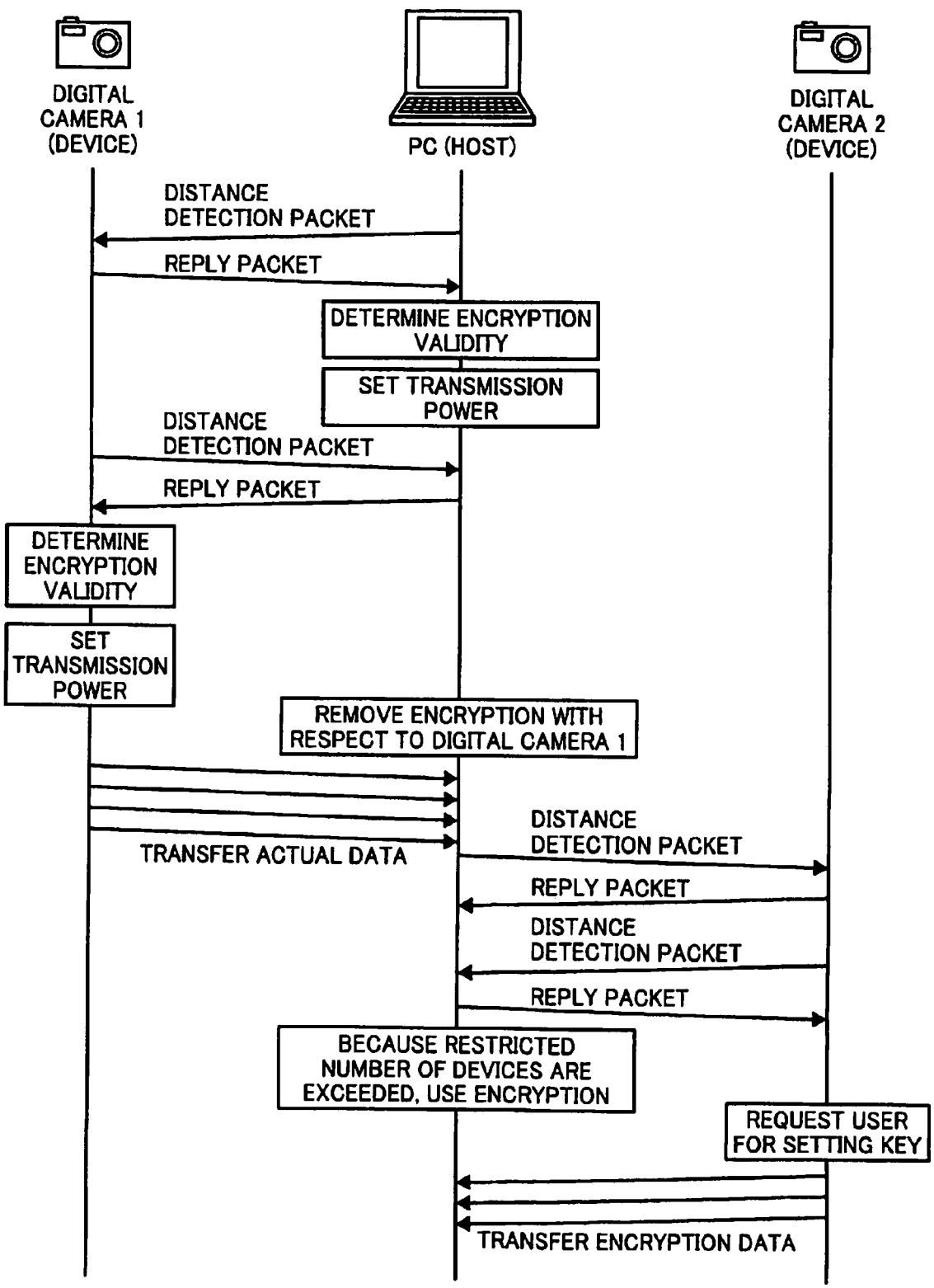
FIG. 12 is a sequence diagram for explaining an overview of the communication process according to the third embodiment.

FIG. 12 is a sequence diagram for explaining an overview of the communication process according to the third embodiment. In the example shown in FIG. 12, a number of devices that can be connected by the encryption invalidated communication is restricted to one. As shown in FIG. 12, a laptop that functions as the communicating apparatus 1000 executes the distance detection process, encryption validity determining process, and the transmission power setting process for respective digital cameras 1 and 2 that are the communication targets.

Because the number of devices exceeds the restricted number of devices (one) that can communicate by invalidating the encryption, the laptop establishes an encryption validated communication with respect to the digital camera 2 that is the second communication target. When communication is established, the digital camera 2 requests the user for setting the key.

Thus, in the communicating apparatus according to the third embodiment, because the number of communication targets that communicate by invalidating the encryption can be restricted, improper connection with a device can be prevented.

Upon determining that the distance between the communication targets is smaller than the threshold value, a communicating apparatus according to a fourth embodiment of the present invention once again transmits using the transmission power that is gradually increased from an initial value of the transmission power, the distance detection packet to the communication target. The communicating apparatus also calculates as the minimum transmission power that enables communication, the transmission power when the reply packet is received.

Figure 13:
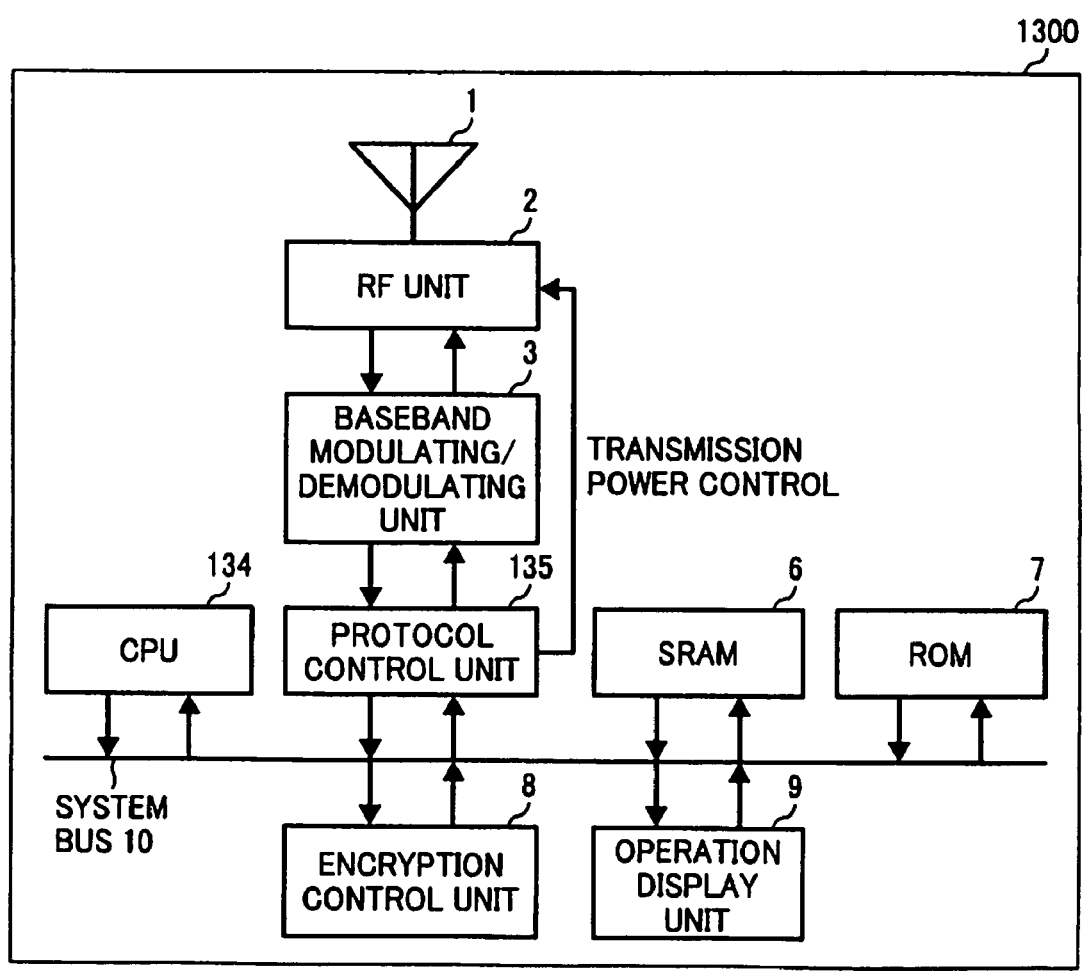
FIG. 13 is a block diagram of a communicating apparatus according to a fourth embodiment of the present invention.

FIG. 13 is a block diagram of a communicating apparatus 1300 according to the fourth embodiment. As shown in FIG. 13, the communicating apparatus 1300 includes the antenna 1, the RF unit 2, the baseband modulating/demodulating unit 3, a CPU 134, a protocol control unit 135, the SRAM 6, the ROM 7, the encryption control unit 8, and the operation display unit 9 that are connected by the system bus 10.

In the fourth embodiment, functions of the CPU 134 and the protocol control unit 135 differ from the functions of the CPU 4 and the protocol control unit 5 according to the first embodiment. The remaining structure and the functions, of the communicating apparatus 1300, which are similar to the structure and the respective functions of the communicating apparatus 100 according to the first embodiment, are indicated by the same reference numerals and an explanation is omitted.

In the fourth embodiment, compared to the CPU 4 according to the first embodiment, upon detecting that the distance is smaller than the threshold value, the CPU 134 calculates the transmission power that is gradually increased by a predetermined value from a predetermined initial power.

In the fourth embodiment, compared to the protocol control unit 5 according to the first embodiment, the protocol control unit 135 transmits the distance detection packet to the communication target using the transmission power calculated by the CPU 134. The protocol control unit 135 uses the transmission power when the reply packet is received in response to the transmitted distance detection packet as the minimum transmission power for using in the further communication.

Figure 14:
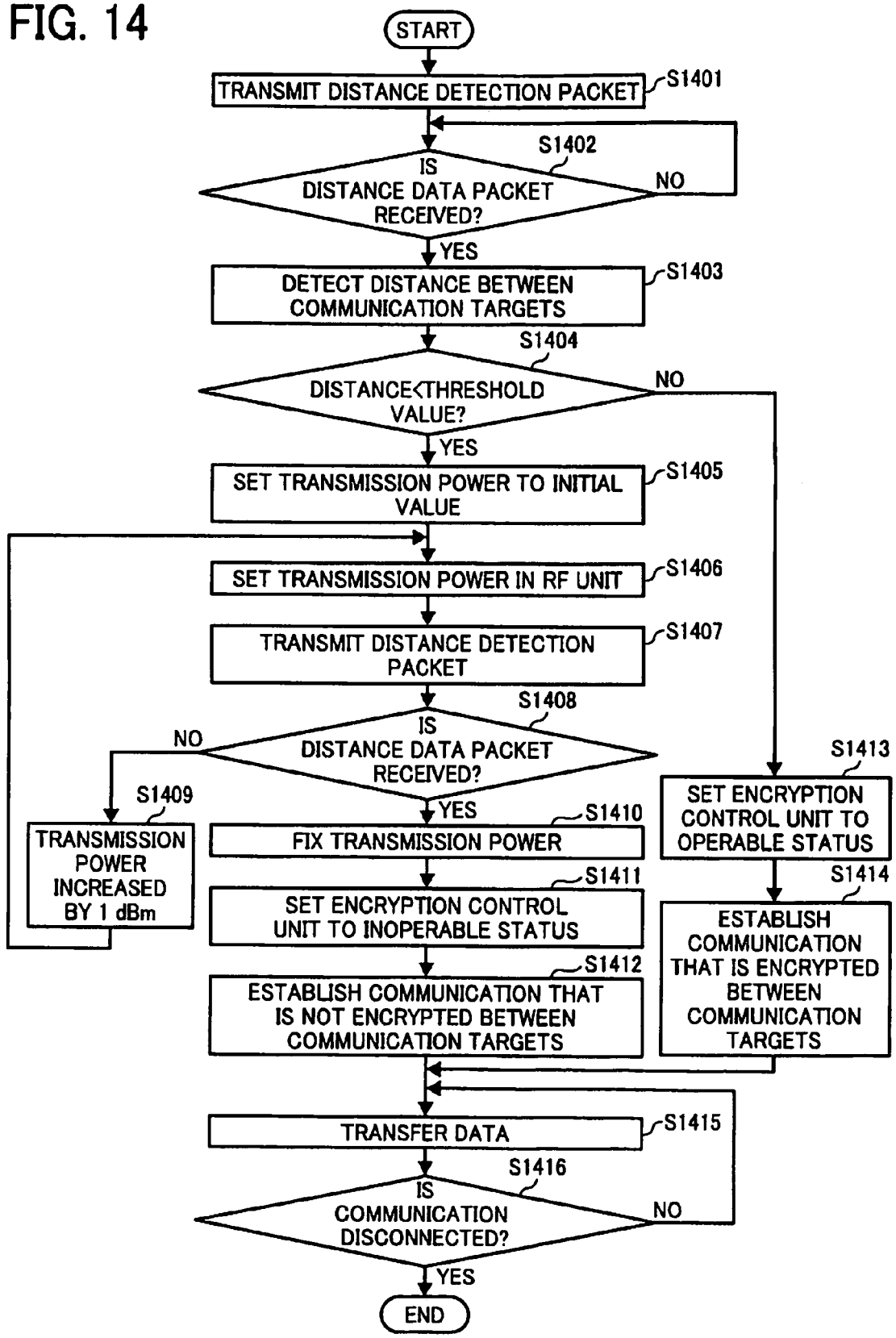
FIG. 14 is a flowchart for explaining an entire communication process according to the fourth embodiment.

A communication process performed by the communicating apparatus 1300 according to the fourth embodiment is explained next. FIG. 14 is a flowchart for explaining the entire communication process according to the fourth embodiment.

Steps S1401 to S1404 of the distance detection process and the threshold comparison process are similar to Steps S401 to S404 of the respective processes performed by the communicating apparatus 100 according to the first embodiment and the explanation is omitted.

If the detected distance is smaller than the distance threshold value (Yes at Step S1404), the CPU 134 sets the transmission power to the predetermined initial value and notifies the transmission power to the protocol control unit 135 (Step S1405). A minimum value that can be set in the RF unit 2 is used as the initial value.

The protocol control unit 135 sets the RF unit 2 such that the wireless signals are transmitted using the notified transmission power (Step S1406) and once again generates and transmits the distance detection packet (Step S1407). The protocol control unit 135 determines whether the distance data packet, which is the reply packet in response to the transmitted distance detection packet, is received (Step S1408).

If the distance data packet cannot be received (No at Step S1408), the CPU 134 calculates the transmission power that is increased by 1 decibel per milliwatt (dBm) (Step S1409). The protocol control unit 135 sets the newly calculated transmission power to the RF unit 2 and the process is repeated (Step S1406).

If the distance data packet can be received (Yes at Step S1408), the protocol control unit 135 uses the transmission power when the distance data packet is received as the minimum transmission power that is the minimum value of the transmission power enabling communication (Step S1410).

Steps S1411 to S1416 of the communication process are similar to Steps S407 to S412 of the respective processes performed by the communicating apparatus 100 according to the first embodiment and the explanation is omitted.

Figure 15:
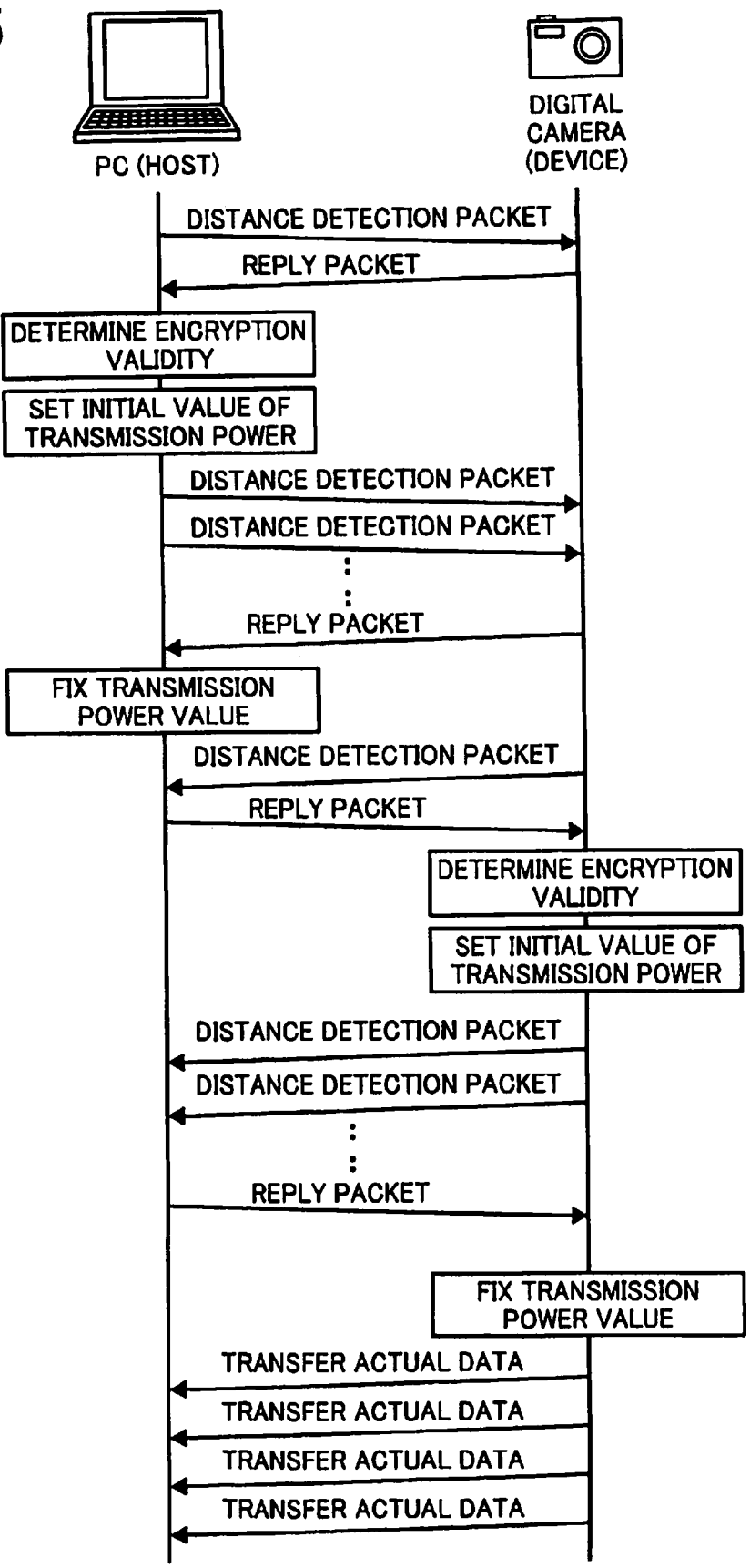
FIG. 15 is a sequence diagram for explaining an overview of the communication process according to the fourth embodiment.

FIG. 15 is a sequence diagram for explaining an overview of the communication process according to the fourth embodiment. As shown in FIG. 15, a laptop that functions as the communicating apparatus 1300 and a digital camera that functions as the communicating apparatus 1300 set the initial value of the transmission power and repeat transmission of the distance detection packet. The laptop and the digital camera fix the transmission power value when the reply packet is received as the minimum transmission power and use the fixed minimum transmission power in the further communication.

Thus, in the communicating apparatus according to the fourth embodiment, because the appropriate transmission power can be calculated according to the communication targets, a system structure compatible with the user environment can be realized.

A communicating apparatus according to a fifth embodiment of the present invention repeats for the predetermined number of times, transmission of the distance detection packet using the transmission power that is gradually increased from the initial value and calculated. The communicating apparatus uses as the minimum transmission power, the transmission power calculated when the reply packet can be successfully received.

Figure 16:
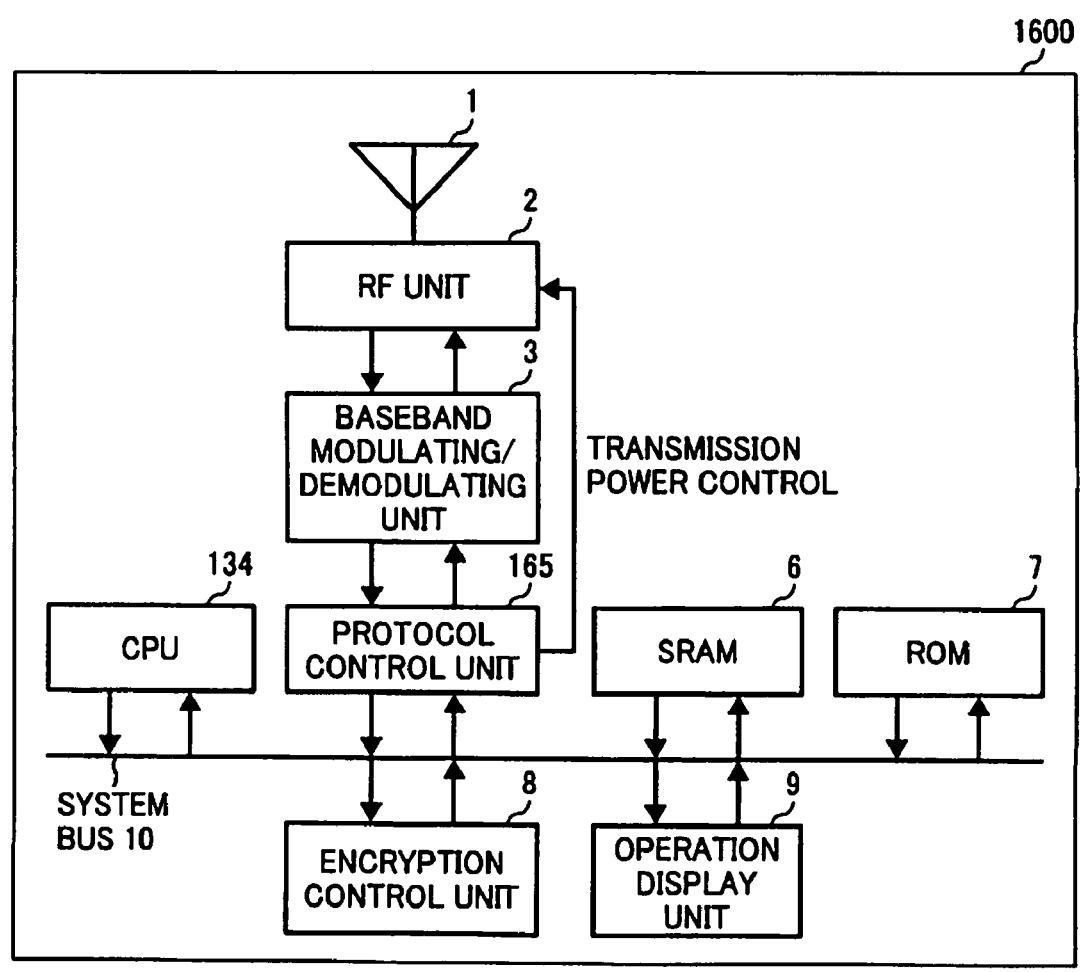
FIG. 16 is a block diagram of a communicating apparatus according to a fifth embodiment of the present invention.

FIG. 16 is a block diagram of a communicating apparatus 1600 according to the fifth embodiment. As shown in FIG. 16, the communicating apparatus 1600 includes the antenna 1, the RF unit 2, the baseband modulating/demodulating unit 3, the CPU 134, a protocol control unit 165, the SRAM 6, the ROM 7, the encryption control unit 8, and the operation display unit 9 that are connected by the system bus 10.

In the fifth embodiment, functions of the protocol control unit 165 differ from the functions of the protocol control unit 135 according to the fourth embodiment. The remaining structure and the functions, of the communicating apparatus 1600, which are similar to the structure and the respective functions of the communicating apparatus 1300 according to the fourth embodiment shown in FIG. 13, are indicated by the same reference numerals and an explanation is omitted.

In the fifth embodiment, compared to the protocol control unit 135 according to the fourth embodiment, the protocol control unit 165 transmits the distance detection packets using the transmission power calculated by the CPU 134 for the predetermined number of times and uses the calculated transmission power as the minimum transmission power when all the reply packets are received in response to the transmitted distance detection packets.

Figure 17A:
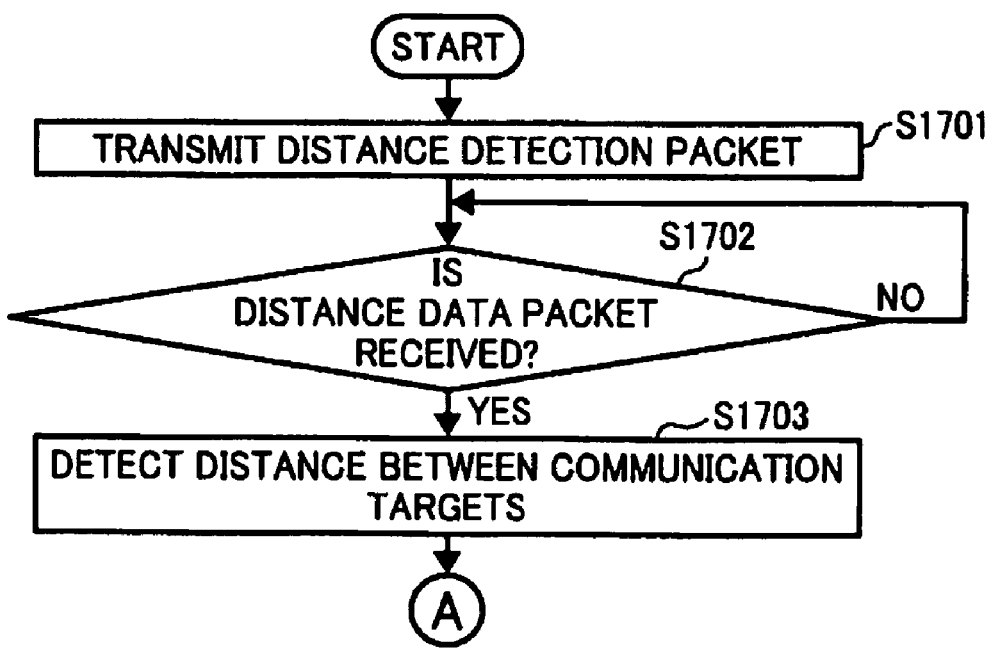
FIG. 17 is a flowchart for explaining an entire communication process according to the fifth embodiment.
Figure 17B:
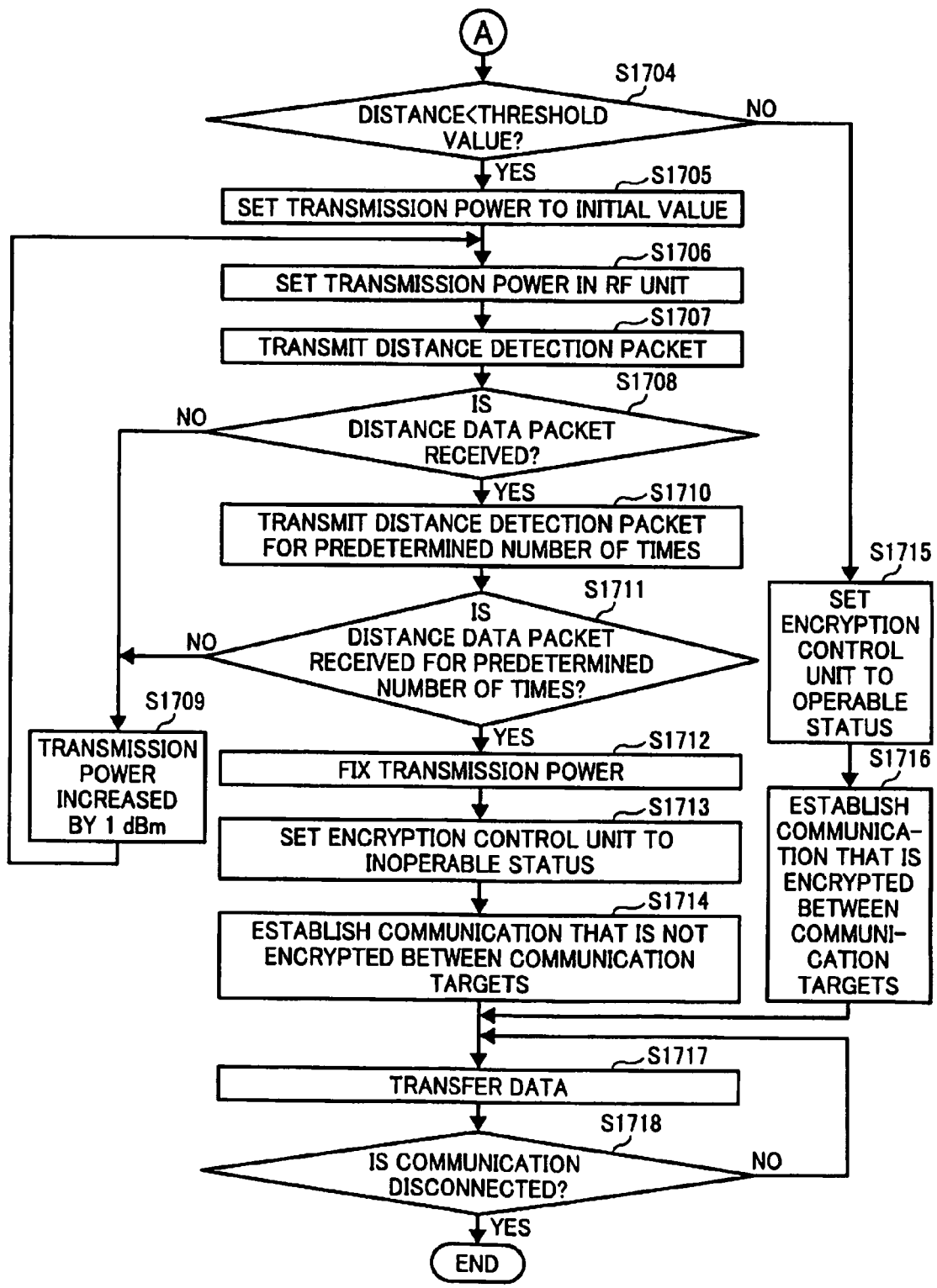

A communication process performed by the communicating apparatus 1600 according to the fifth embodiment is explained next. FIG. 17 is a flowchart for explaining the entire communication process according to the fifth embodiment.

Steps S1701 to S1709 of the distance detection process, the threshold value comparison process, and the transmission power calculating process are similar to Steps S1401 to S1409 of the respective processes performed by the communicating apparatus 1300 according to the fourth embodiment and the explanation is omitted.

If the distance data packet can be received at Step S1708 (Yes at Step S1708), the protocol control unit 165 further transmits the distance detection packet and repeats the process for receiving the distance data packet that is the reply packet for the predetermined number of times (Step S1710). The protocol control unit 165 determines whether the distance data packet is received for the predetermined number of times (Step S1711).

If the distance data packet cannot be received for the predetermined number of times (No at Step S1711), the CPU 134 re-calculates the transmission power increased by 1 dBm (Step S1709) and the process is repeated. If the distance data packet can be received for the predetermined number of times (Yes at Step S1711), the protocol control unit 165 uses the transmission power when the distance data packet is received as the minimum transmission power that is the minimum value of the transmission power enabling communication (Step S1712).

Steps S1713 to S1718 of the communication process are similar to Steps S1411 to S1416 of the respective processes performed by the communicating apparatus 1300 according to the fourth embodiment and the explanation is omitted.

Figure 18:
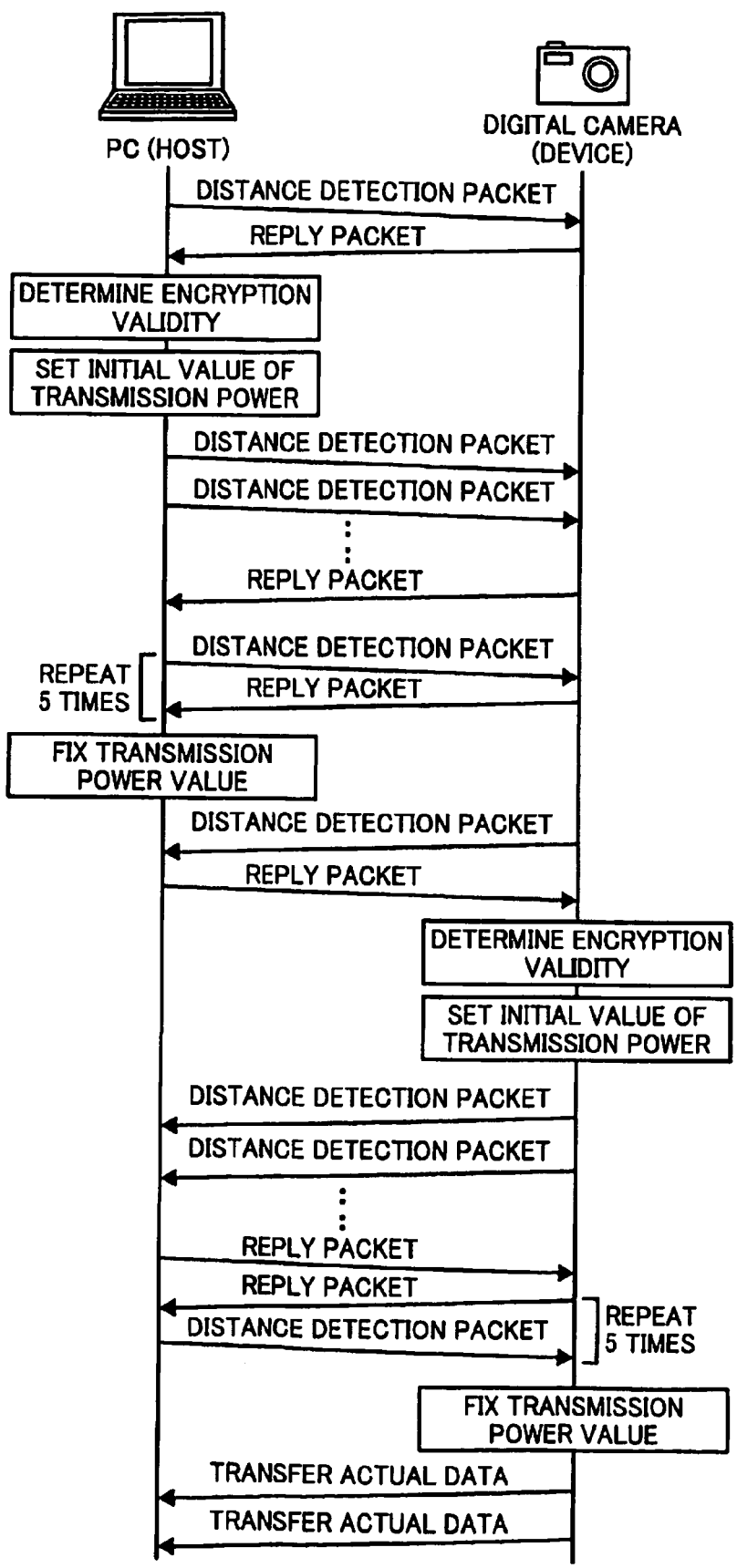
FIG. 18 is a sequence diagram for explaining an overview of the communication process according to the fifth embodiment.

FIG. 18 is a sequence diagram for explaining an overview of the communication process according to the fifth embodiment. As shown in FIG. 18, a laptop that functions as the communicating apparatus 1600 and a digital camera that functions as the communicating apparatus 1600 set the initial value of the transmission power and repeat transmission of the distance detection packet. The laptop and the digital camera also calculate the transmission power when the reply packet can be received and repeat the transmission of the distance detection packet using the calculated transmission power value for the predetermined number of times (for example, five times). When the reply packet can be successfully received, the laptop and the digital camera fix the calculated transmission power and use as the minimum transmission power.

Thus, in the communicating apparatus according to the fifth embodiment, transmission of the distance detection packet can be repeated for the predetermined number of times and when the reply packet can be successfully received, the calculated transmission power can be used as the minimum transmission power. Due to this, a secured connection is enabled by calculating the appropriate transmission power with high precision.

A communication program executed by the communicating apparatuses according to the first to the fifth embodiments is prior stored in the ROM and provided.

The communication program executed by the communicating apparatuses according to the first to the fifth embodiments can be provided by storing in a file, in an installable format or an executable format, that is stored in a computer-readable recording medium such as a compact disk read-only memory (CD-ROM), a flexible disk (FD), a compact disk recordable (CD-R), and a digital versatile disk (DVD).

The communication program executed by the communicating apparatuses according to the first to the fifth embodiments can be provided by storing in a computer connected to a network such as Internet and can be downloaded through the network. Alternatively, the communication program executed by the communicating apparatuses according to the first to the fifth embodiments can be provided or distributed via the network such as Internet.

The communication program executed by the communicating apparatuses according to the first to the fifth embodiments is a modular structure that executes each function mentioned earlier (functions of a detecting unit, a determining unit, a calculating unit, an establishing unit, and a communication control unit). Because the CPU (processor) that functions as actual hardware reads the communication program from the ROM and executes the communication program, each unit is loaded and generated on a main storage device.

According to one aspect of the present invention, a security function such as encryption can be excluded when a distance between communication targets is smaller. Thus, a convenient communication environment can be provided in which a user is not requested to set an unnecessary key.

Furthermore, according to another aspect of the present invention, a status of the communication targets can be sequentially understood by measuring the distance between the communication targets at regular intervals. Thus, a communicating apparatus can flexibly deal with a change in the status.

Moreover, according to still another aspect of the present invention, improper connection with a device can be avoided by restricting a number of communication targets that can be connected.

Furthermore, according to still another aspect of the present invention, a system structure compatible with a user environment can be realized by calculating appropriate transmission power with respect to the communication targets.

Moreover, according to still another aspect of the present invention, the appropriate transmission power can be calculated with high precision. Thus, a secured connection is enabled.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communicating apparatus comprising:
 a communicating unit that exchanges a message with an external device using a wireless signal;
 a communication control unit that transmits a detection message for detecting a distance to the external device to the external device and receives a reply message in response to the detection message from the external device, via the communicating unit;
 a first calculating unit that calculates the distance based on a response time required to receive the reply message;
 a determining unit that determines whether the distance is smaller than a first threshold;
 an establishing unit that establishes, when the distance is determined to be smaller than the first threshold, an encryption invalidated communication in which the message is not encrypted with the external device; and
 a second calculating unit that calculates, when the distance is determined to be smaller than the first threshold, a minimum transmission power of the wireless signal for performing a communication with the external device at the distance, wherein
 the communication control unit controls the communicating unit to transmit the message to the external device using the wireless signal with the minimum transmission power.

2. The communicating apparatus according to claim 1, wherein the communication control unit transmits the detection message to the external device in every predetermined time.

3. The communicating apparatus according to claim 2 further comprising:
 a third calculating unit that calculates a difference between a first distance detected before lapse of the predetermined time and a second distance detected after lapse of the predetermined time, wherein
 the determining unit further determines whether the difference is larger than a second threshold, and
 the communicating apparatus further comprises a disconnecting unit that disconnects, when the difference is determined to be larger than the second threshold, the encryption invalidated communication with the external device.

4. The communicating apparatus according to claim 1, further comprising a threshold input unit for inputting the first threshold.

5. The communicating apparatus according to claim 1, wherein
 when a plurality of encryption invalidated communications is established with a plurality of external devices, the determining unit further determines whether number of the encryption invalidated communications is smaller than a second threshold, and
 if the number of the encryption invalidated communications is determined to be smaller than the second threshold, the establishing unit establishes the encryption invalidated communications with the external devices.

6. The communicating apparatus according to claim 1, further comprising:
 a third calculating unit that calculates, when the distance is determined to be smaller than the first threshold, a transmission power that is gradually increased from a predetermined initial power, wherein
 the communication control unit controls the communicating unit to transmit the detection message to the external device using a wireless signal with a calculated transmission power, and
 when the reply message is received in response to the detection message transmitted with the calculated transmission power, the second calculating unit takes the calculated transmission power as the minimum transmission power.

7. The communicating apparatus according to claim 6, wherein the communication control unit further compares number of reply messages received in response to detection messages transmitted with the calculated transmission power with a second threshold, and when the number of reply messages is larger than the second threshold, the second calculating unit takes the calculated transmission power as the minimum transmission power.

8. The communicating apparatus according to claim 1, further comprising:
 a data input unit for inputting permission data indicating whether to permit an establishment of the encryption invalidated communication with the external device, wherein
 the establishing unit establishes the encryption invalidated communication with the external device when the distance is determined to be smaller than the first threshold and when the permission data is input by the data input unit.

9. A communication method for a communicating apparatus including a communicating unit that exchanges a message with an external device using a wireless signal, the communication method comprising:
   controlling including transmitting a detection message for detecting a distance to the external device to the external device and receiving a reply message in response to the detection message from the external device, via the communicating unit;
   first calculating including calculating the distance based on a response time required to receive the reply message;
   determining whether the distance is smaller than a first threshold;
   establishing, when the distance is determined to be smaller than the first threshold, an encryption invalidated communication in which the message is not encrypted with the external device; and
   second calculating including calculating, when the distance is determined to be smaller than the first threshold, a minimum transmission power of the wireless signal for performing a communication with the external device at the distance, wherein
   the controlling further includes controlling the communicating unit to transmit the message to the external device using the wireless signal with the minimum transmission power.

10. A computer program product comprising a computer-usable medium having computer-readable program codes embodied in the medium for realizing a communication method for a communicating apparatus including a communicating unit that exchanges a message with an external device using a wireless signal, the program codes when executed causing a computer to execute:
   controlling including transmitting a detection message for detecting a distance to the external device to the external device and receiving a reply message in response to the detection message from the external device, via the communicating unit;
   first calculating including calculating the distance based on a response time required to receive the reply message;
   determining whether the distance is smaller than a first threshold;
   establishing, when the distance is determined to be smaller than the first threshold, an encryption invalidated communication in which the message is not encrypted with the external device; and
   second calculating including calculating, when the distance is determined to be smaller than the first threshold, a minimum transmission power of the wireless signal for performing a communication with the external device at the distance, wherein
   the controlling further includes controlling the communicating unit to transmit the message to the external device using the wireless signal with the minimum transmission power.

* * * * *